(12) United States Patent
Clerc et al.

(10) Patent No.: US 10,983,367 B2
(45) Date of Patent: Apr. 20, 2021

(54) OPHTHALMIC LENS IN PARTICULAR FOR SUNGLASSES

(71) Applicant: BNL EUROLENS, Bellegarde sur Valserine (FR)

(72) Inventors: Didier Clerc, Bellegarde sur Valserine (FR); Franck Ledien, Bellegarde sur Valserine (FR)

(73) Assignee: BNL EUROLENS, Bellegarde-sur-Valserine (FR)

( * ) Notice: Subject to any disclaimer, the term of this patent is extended or adjusted under 35 U.S.C. 154(b) by 106 days.

(21) Appl. No.: 16/321,395

(22) PCT Filed: Jul. 25, 2017

(86) PCT No.: PCT/EP2017/068713
§ 371 (c)(1),
(2) Date: Jan. 28, 2019

(87) PCT Pub. No.: WO2018/019806
PCT Pub. Date: Feb. 1, 2018

(65) Prior Publication Data
US 2019/0179169 A1 Jun. 13, 2019

(30) Foreign Application Priority Data

Jul. 26, 2016 (FR) ...................................... 1657181

(51) Int. Cl.
*G02C 7/10* (2006.01)
*B29D 11/00* (2006.01)
(Continued)

(52) U.S. Cl.
CPC ........ *G02C 7/107* (2013.01); *B29D 11/00009* (2013.01); *B29D 11/0073* (2013.01);
(Continued)

(58) Field of Classification Search
CPC .... G02C 2202/16; G02C 7/107; G02C 7/102; G02C 7/12; G02C 7/14; B29D 11/00009;
(Continued)

(56) References Cited

U.S. PATENT DOCUMENTS 4,826,286 A * 5/1989 Thornton, Jr. ......... G02C 7/104
359/588
5,360,659 A * 11/1994 Arends ............. B32B 17/10018
359/359
(Continued)

FOREIGN PATENT DOCUMENTS

CN 104311687 A 1/2015
CN 105556346 A 5/2016
(Continued)

OTHER PUBLICATIONS

Office Action in Corresponding Chinese application No. 201780058361.3, dated Jan. 20, 2020.
(Continued)

*Primary Examiner* — William R Alexander
(74) *Attorney, Agent, or Firm* — Norton Rose Fulbright US LLP (57) ABSTRACT

The invention relates to an ophthalmic lens (1), in particular for sunglasses, comprising: a first outer layer (9) of transparent substrate, comprising a rear face ($9_{AR}$), intended to be orientated towards the eye of a user of said ophthalmic lens (1), and a front face ($9_{AV}$) intended to be orientated towards the field of vision (13) of the user, intended to form the convex, front outer surface of the ophthalmic lens (1), a second outer layer (10) of transparent substrate, comprising a rear face ($10_{AR}$) orientated towards the eye of the user, intended to form the concave, rear outer face of the ophthalmic lens (1) orientated towards the eye of the user, and a front face ($10_{AR}$) orientated towards the field of vision of the user, characterized in that the lens further comprises an
(Continued)

interferometric mirror (21) disposed between the first outer layer (9) and the second outer layer (10).

29 Claims, 4 Drawing Sheets (51) Int. Cl.
G02B 5/28 (2006.01)
G02C 7/12 (2006.01)
G02C 7/14 (2006.01)
G02B 5/30 (2006.01)

(52) U.S. Cl.
CPC .. *B29D 11/00403* (2013.01); *B29D 11/00644* (2013.01); *B29D 11/00653* (2013.01); *G02B 5/285* (2013.01); *G02C 7/102* (2013.01); *G02C 7/12* (2013.01); *G02C 7/14* (2013.01); *G02B 5/3033* (2013.01); *G02C 2202/16* (2013.01)

(58) Field of Classification Search
CPC ........ B29D 11/00403; B29D 11/00644; B29D 11/00653; B29D 11/0073; G02B 5/285; G02B 5/3033
USPC ...................................... 351/159.62
See application file for complete search history.

(56) References Cited

U.S. PATENT DOCUMENTS

| | | | |
|---|---|---|---|
| 6,531,230 B1* | 3/2003 | Weber | B32B 7/02 428/480 |
| 8,709,582 B2* | 4/2014 | Zheng | C09D 7/62 428/216 |
| 2004/0257525 A1 | 12/2004 | Moravec et al. | |
| 2005/0233123 A1* | 10/2005 | Weber | G02B 1/111 428/215 |
| 2013/0088783 A1* | 4/2013 | Liu | B29C 48/21 359/586 |
| 2013/0271725 A1 | 10/2013 | Chiou et al. | |
| 2014/0233105 A1* | 8/2014 | Schmeder | G02C 7/107 359/590 |
| 2014/0327967 A1 | 11/2014 | Blair et al. | |
| 2015/0146166 A1 | 5/2015 | Weber et al. | |

FOREIGN PATENT DOCUMENTS

| | | |
|---|---|---|
| CN | 105629509 | 6/2016 |
| CN | 105765422 A | 7/2016 |
| DE | 3837008 | 5/1990 |
| TW | 201341886 | 10/2013 |
| WO | WO 2013/070417 | 5/2013 |

OTHER PUBLICATIONS

International Search Report and Written Opinion issued in International Patent Application No. PCT/EP2017/068713 dated Nov. 21, 2017.

Second Office Action issued by the Chinese National Intellectual Property Administration (CNIPA) in Chinese Patent Application No. 2017800583613 dated Nov. 9, 2020.

* cited by examiner

OPHTHALMIC LENS IN PARTICULAR FOR SUNGLASSES

CROSS-REFERENCE TO RELATED APPLICATIONS

This application is a national phase application under 35 U.S.C. § 371 of International Application No. PCT/EP2017/068713 filed 25 Jul. 2017, which claims priority to French Patent Application No. 1657181 filed 26 Jul. 2016. The entire contents of each of the above-referenced disclosures is specifically incorporated by reference herein without disclaimer.

The present invention relates to an ophthalmic lens in particular for sunglasses.

Wearing sunglasses, in particular when it is very bright outside, is medically recommended to preserve one's long-term vision potential and also for safety reasons, for example when driving.

It is known to produce ophthalmic lenses or spectacle or sunglass lenses that attenuate perceived luminosity by means of a semi-reflective mirror allowing potentially dazzling reflections of the sun to be attenuated while giving a mirror-like appearance with aesthetically pleasing colored reflexes to the ophthalmic lenses.

These ophthalmic lens furthermore allow the perception of contrasts and of volumes to be improved, thereby improving visibility, in particular when driving or on snow.

In some cases, the last external layer, i.e. the layer directed toward the visual field of the user, is therefore a layer forming a semi-reflective mirror. This last external layer is generally formed from a stack of thin layers forming an interferometric mirror.

However, since it is the last external layer, i.e. the layer directed toward the visual field, this external layer is also exposed to all types of external aggression, such as the deposition of dirt, scratches, etc., this possibly over time decreasing the effectiveness of this layer forming the mirror.

In order to at least partially solve the aforementioned problem, one subject of the invention is an ophthalmic lens in particular for sunglasses, comprising:
- a first external transparent substrate layer comprising a back face, which is intended to be oriented toward the eye of a user of said ophthalmic lens, and a front face intended to be oriented toward the visual field of the user and intended to form the convex front external surface of the ophthalmic lens,
- a second external transparent substrate layer comprising a rear face oriented toward the eye of the user, which face is intended to form the concave rear external surface of the ophthalmic lens oriented toward the eye of the user, and a front face oriented toward the visual field of the user, characterized in that it furthermore comprises an interferometric mirror placed between the first external layer and the second external layer.

Thus, the interferometric mirror is protected from external aggression and can therefore no longer undergo degradation following such aggression.

Said ophthalmic lens may furthermore have one or more of the following features, whether alone or in combination.

The interferometric mirror for example comprises a succession of thin layers including at least a first thin layer having a first refractive index and located as close as possible to the rear face of the first external transparent substrate layer, and a second thin layer having a second refractive index higher than the first refractive index and located as close as possible to the front face of the second external transparent substrate layer.

The interferometric mirror may comprise at least four and in particular six thin layers.

The one or more first thin layers are made of silica and the one or more second thin layers are made of titanium pentoxide, these layers being arranged in alternation.

The one or more first thin layers having a first refractive index have a thickness comprised between 80 μm and 250 μm and in particular between 100 μm and 210 μm, and in that the one or more second thin layers having a second refractive index higher than the first refractive index have a thickness comprised between 15 μm and 50 μm and in particular between 20 μm and 40 μm.

In the visible domain, the one or more thin first layers have a first refractive index lower than 1.5 and the one or more second thin layers have a second refractive index higher than 2, in particular 2.3.

The ophthalmic lens may furthermore comprise a tie layer having a front face placed against the rear face of the first external layer and a rear face placed against a front face of the interferometric mirror.

The ophthalmic lens for example furthermore comprises a polarizing assembly placed between the interferometric mirror and the second external substrate layer.

The ophthalmic lens furthermore for example comprises a photochromic layer that is activatable in the UV domain and/or in the visible domain and that is placed between the interferometric mirror and the second external substrate layer.

The photochromic layer is in particular placed against the interferometric mirror.

The photochromic layer is in particular placed closer to the interferometric mirror than the polarizing assembly.

The first external layer and the second external layer may be independently chosen from the group of the following materials: mineral organic glass, in particular polymethyl methacrylate, polycarbonate, polycarbonate/polyester blends, polyamide, polyester, cyclic olefin copolymers, polyurethane, polysulfone, cellulose triacetate (CTA) or cellulose acetate butyrate and a combination thereof.

The ophthalmic lens may comprise a tinted substrate layer comprising a colorant or a pigment, said layer being placed downstream of the interferometric mirror and where appropriate behind the photochromic layer.

The second external layer may for example form the tinted substrate layer.

Another subject of the invention is a process for manufacturing an ophthalmic lens such as defined above, comprising the following steps:
- a tie layer is produced on the rear face of the first external transparent substrate layer,
- the interferometric mirror is fastened to the rear face of the tie layer,
- a second external layer is produced downstream of the interferometric mirror.

This process for manufacturing an ophthalmic lens may furthermore have one or more of the following features, whether alone or in combination.

The second external layer is for example produced by injection molding downstream of the rear face of the interferometric mirror, in particular by injection molding on a tie layer fastened to the rear face of the interferometric mirror.

A polarizing assembly may be fastened to the rear face of the interferometric mirror and the second external layer placed downstream of the polarizing assembly.

A photochromic layer may be fastened to the rear face of the interferometric mirror and the second external layer placed downstream of the photochromic layer.

A polarizing assembly may be fastened to the rear face of the photochromic layer and the second external layer placed downstream of the polarizing assembly.

Other features and advantages of the invention will become more clearly apparent on reading the following description, which is given by way of illustrative and nonlimiting example, and the appended drawings, in which.

An example of one embodiment will now be described with reference to the figures. In all the figures, the same references have been used to reference elements that are the same.

Figure 1A:
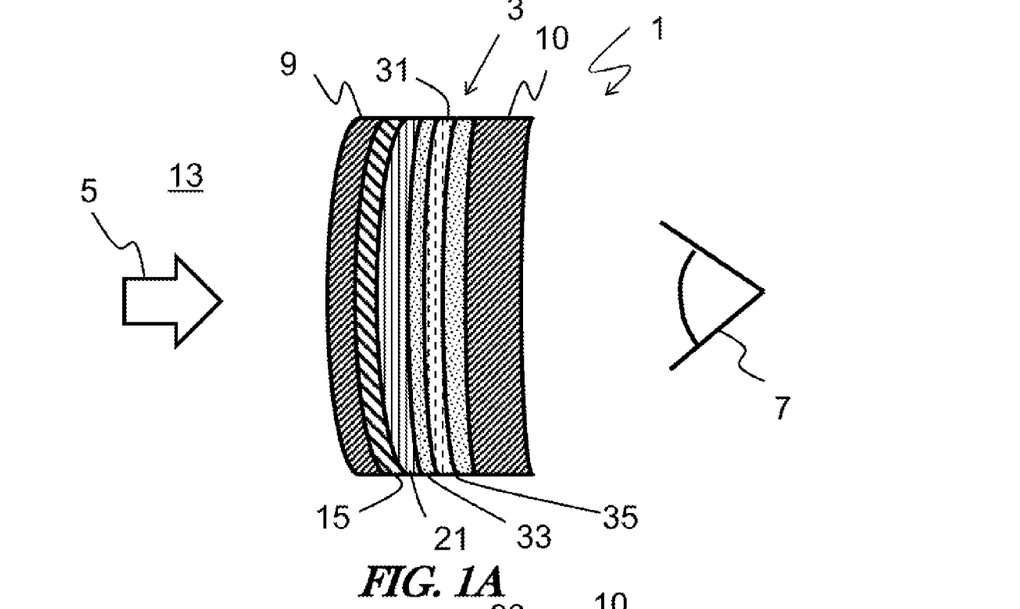
FIG. 1A schematically shows an ophthalmic lens according to the invention.
Figure 1B:
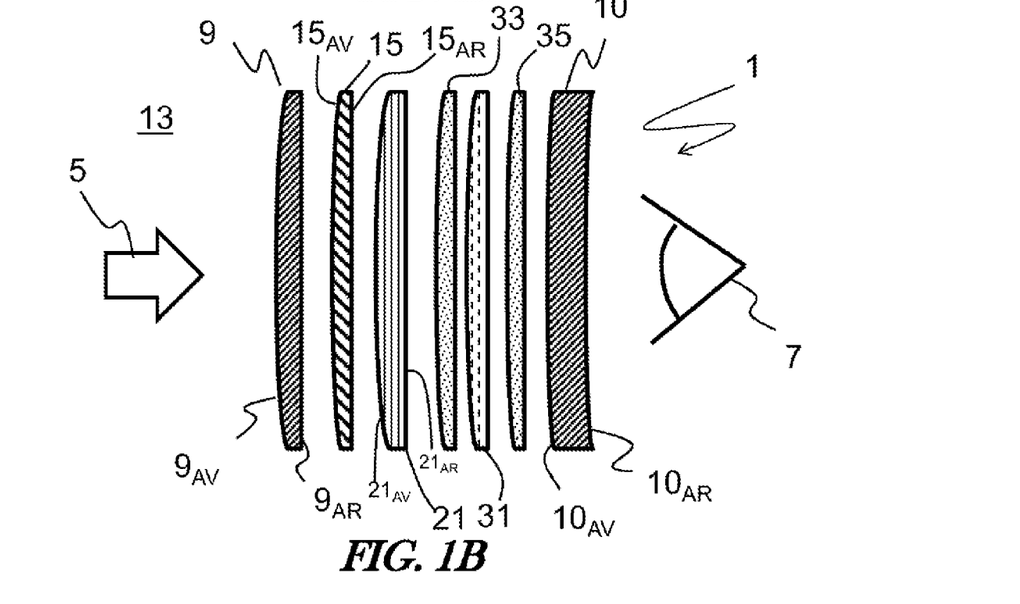
FIG. 1B shows the ophthalmic lens of FIG. 1A exploded along its axis, artificially separating the various layers forming the ophthalmic lens, FIG. 2 schematically shows the stack of layers of a lens of FIGS. 1A and 1B according to a first embodiment FIG. 3 schematically shows the stack of layers of a lens according to a second embodiment, FIG. 4 schematically shows the stack of layers of a lens according to a third embodiment, FIG. 5 schematically shows the stack of layers of a lens according to a fourth embodiment, FIG. 6A-6D schematically show flowcharts allowing the various embodiments of the process for manufacturing an ophthalmic lens according to the invention to be illustrated.
Figure 3:
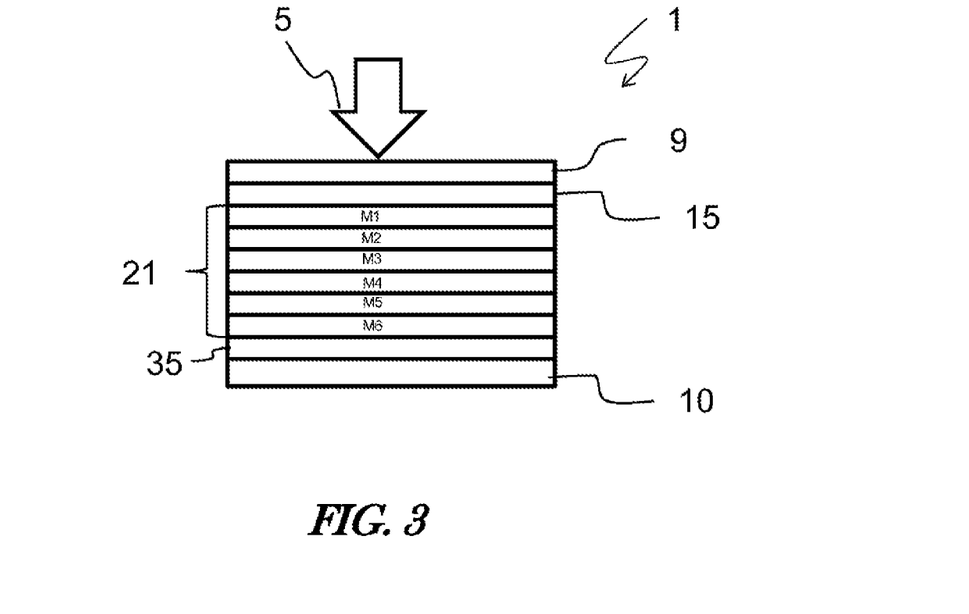
Figure 4:
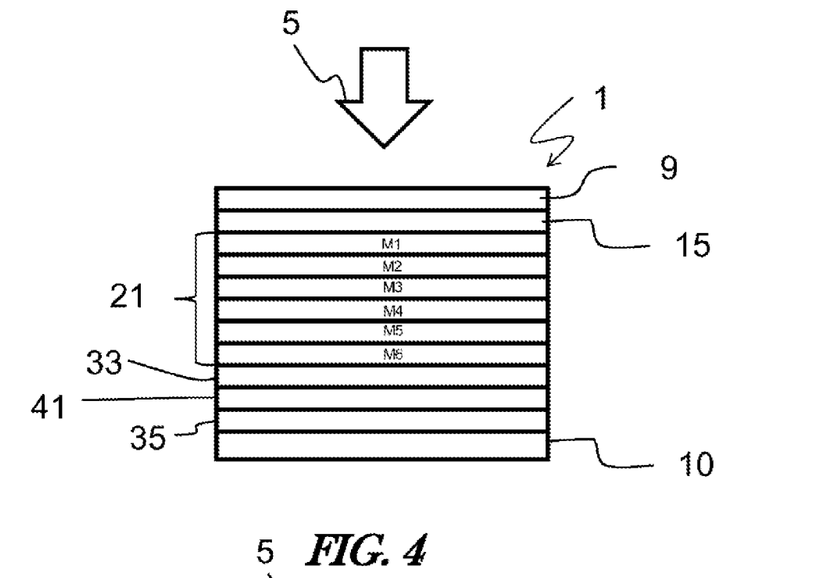
Figure 5:
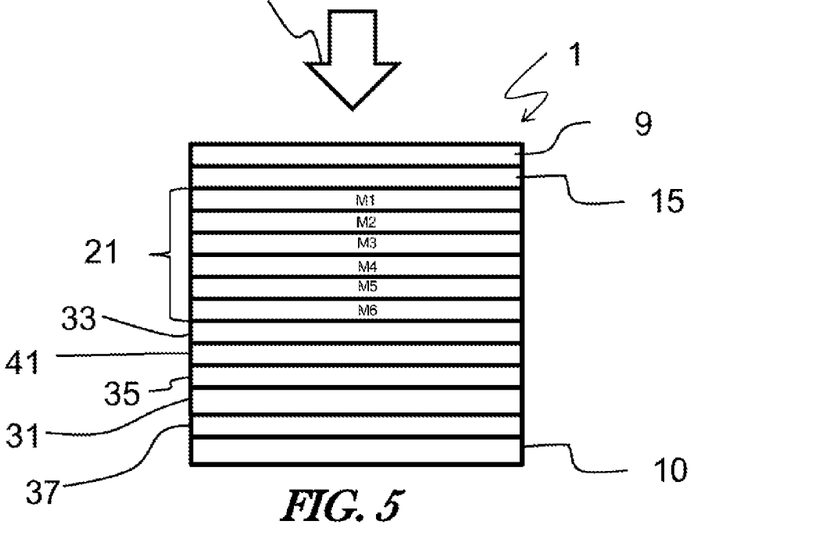

Thus, from the stack schematics of FIGS. 3 to 5, figures similar to FIGS. 1A and 1B may easily be deduced by adding thereto or removing therefrom various layers.

The following embodiments are examples. Although the description refers to one or more embodiments, this does not necessarily mean that each reference relates to the same embodiment, or that the features apply only to a single embodiment. Single features of various embodiments may also be combined to create other embodiments.

By "front" face or "rear" face of a layer, reference is being made to the propagation of light rays toward the eye. Thus, a "front" face is always the face that is closest to the visual field of the user and a "rear" face is always the face that is closest to the eye of the user.

By "upstream" or "downstream" of two elements or layers, reference is being made to the propagation of light rays toward the eye. Thus, a first element is placed "upstream" of a second element when light passes through, on its way toward the eye of the user, firstly the first element, then the second element. In contrast, a first element is placed "downstream" of a second element when light passes through, on its way toward the eye of the user, first the second element, then the first element.

In the present description, the UV domain of the ultraviolet comprises wavelengths lower than 380 nm.

In the present description, the visible domain comprises wavelengths comprised between about 380 nm and about 800 nm, and in particular wavelengths comprised between about 400 nm and 750 nm.

The ophthalmic lens 1 of FIGS. 1A and 1B is for example intended to be used in a pair of spectacles, and in particular a pair of sunglasses. To do this, it is only necessary to trim the external edge 3 to the shape desired for the rim of the frame.

In FIGS. 1A and 1B, an arrow 5 representing the light incident on the lens 1 and an eye 7 representing a user have been shown. The visual field 13 is therefore located on the side of the arrow 7 and the user looks through the ophthalmic lens 1 with his eye 7.

By ophthalmic lens 1 what is meant is a finished or semi-finished, corrective or non-corrective lens able to be mounted in a frame, for example a spectacle frame, goggles or a visor intended to be placed in front of the eyes and forming a visual protective screen.

The ophthalmic lens 1 may be made of mineral glass or of organic glass or of a combination of both mineral glass and organic glass.

The ophthalmic lens 1 may optionally be tinted, may have a tint gradient, and it may comprise other solar functions such as a polarizing function and/or a photochromic function as will be seen below. The ophthalmic lens is for example of class 2, 3 or 4 according to standard ISO 12312.

It may also comprise other additional functions, whether alone or in combination, from the following non-exhaustive list: shock resistance, scratch resistance, wear resistance, anti-reflection, smudge resistance, anti-fog, antistatic. These additional functions may be produced using conventional methods (dip coating, vacuum deposition, spin coating, spray coating, etc.).

With reference to FIGS. 1A and 1B, the ophthalmic lens 1 comprises a first external transparent substrate layer 9 and a second external transparent substrate layer 10.

The first external layer 9 has, on the one hand, a front face $9_{AV}$ oriented toward the visual field 13 of the user and intended to form the front external surface of the ophthalmic lens 1 and, on the other hand, a rear face $9_{AR}$, which is intended to be oriented toward the eye 7 of the user.

The second external transparent substrate layer 10 has a back face $10_{AR}$ intended to be oriented toward the eye 7 of the user, which face is intended to form the rear external surface of the ophthalmic lens 1 oriented toward the eye of the user, and a front face $10_{AV}$ oriented toward the visual field 13 of the user.

By transparent, what is meant is that a layer lets incident light completely or at least partially pass through. The first external transparent substrate layer 9 or the second external transparent substrate layer 10 may be tinted, i.e. for example include colorants and/or pigments, or not.

More generally, the one or more materials of certain layers of the ophthalmic lens 1 may be made of any material commonly used in the field of optics and in particular in the ophthalmic field.

It is for example possible to choose a thermoplastic from the following non-exhaustive group: polymethyl (meth) acrylate, polycarbonate, polycarbonate/polyester blends, polyamide, polyester, cyclic olefin copolymers, polyurethane, polysulfone, cellulose triacetate (CTA), polyimide, polyurethanes; polyethylene terephthalate and polymethyl methacrylate (PMMA) and copolymers and a combination thereof.

It is for example possible to choose a thermoset from the following non-exhaustive group: cellulose acetate butyrate (CAB), ethylene/norbornene copolymers or ethylene/cyclopentadiene copolymers; (homo and copolymers of allylic carbonates of aliphatic or aromatic linear or branched polyols, such as homopolymers of diethylene glycol bis(allyl carbonate) (CR 39®); (homo and copolymers of methacrylic acid and esters, which may be derivatives of bisphenol A; (polymers and copolymers of thiomethacrylic acid and esters, (polymers and copolymers of urethane and thiourethane), (polymers and copolymers of epoxy), (polymers and copolymers of sulfides and episulfides) and combinations thereof.

To color the thermoplastic, it is possible to add pigments or colorants. Regarding pigments, the latter may be organic or mineral pigments.

The material of these external layers 9 and 10 is for example chosen from the group of the following materials: polymethyl (meth)acrylate, polycarbonate, polycarbonate/polyester blends, polyamide, polyester, cyclic olefin copolymers, polyurethane, polysulfone, cellulose triacetate (CTA) or cellulose acetate butyrate and a combination thereof. The two external layers 9 and 10 may be made from the same material or different materials.

The fact that the front face $9_{AV}$ or the rear face $10_{AR}$ form external faces does not prevent these faces from being treated for example with a scratch-resistant or smudge-resistant or antireflection treatment on the rear face thereof.

An interferometric mirror 21 is placed between the two external layers 9 and 10.

To promote the adhesion of the interferometric mirror 21 to the rear face $9_{AR}$ of the external layer 9, the ophthalmic lens 1 for example furthermore comprises a tie layer 15 having a front face $15_{AR}$ placed against the rear face $9_{AR}$ and a rear face $15_{AV}$ placed against a front face $21_{AV}$ of the interferometric mirror 21.

By tie layer 15, what is meant is a layer that allows an interferometric mirror 21 to adhere to the rear face $9_{AR}$ of the external layer 9, and in particular that allows a vacuum deposition of the various layers of the interferometric mirror 21 on the rear face $9_{AR}$ of the first external layer 9. This layer may in one embodiment of the invention be a hard coating (i.e. a scratch-resistant layer), for example based on alkoxysilanes or epoxysilanes or on the hydrolysates thereof and potentially on silica nanoparticles. A few specific examples may be found in patent application US 2005/0123771 or patent applications EP 0 614 957, U.S. Pat. Nos. 4,211,823 and 5,015,523. It may for example comprise γ-glycidoxypropyltrimethoxysilane (GLYMO) and/or dimethyldiethoxysilane (DMDES) and/or triethyl orthosilicate (TEOS) or hydrolysates thereof.

Figure 2:
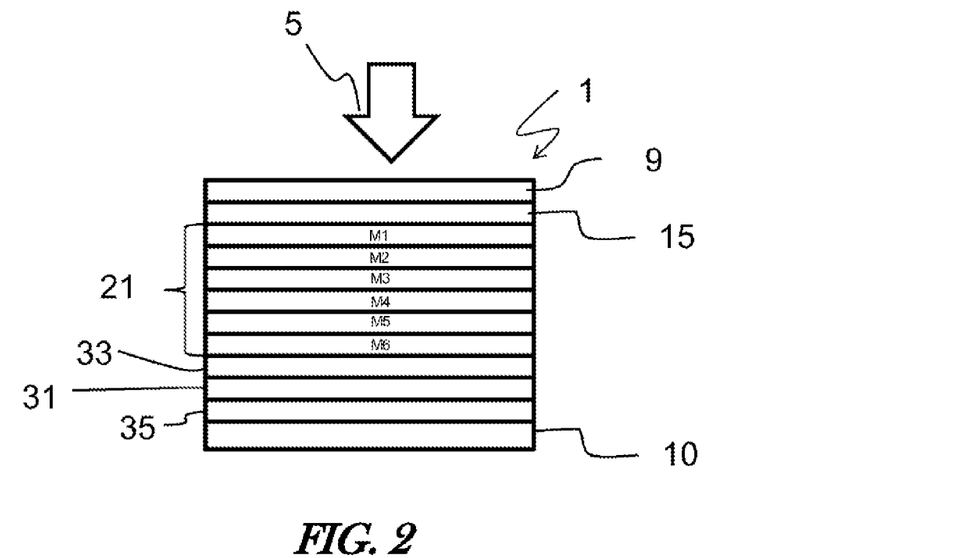

According to the embodiment of FIGS. 1A, 1B and 2, a polarizing assembly 31 for example including a polarizer film in particular of polyvinyl alcohol (PVA) doped with iodide and stretched axially, which type of film is known for its polarizing properties, is placed between the interferometric mirror 21, on the one hand, and the second external layer 10, on the other hand, and fastened thereto by way of adhesive layers 33 and 35. In the polarizing assembly 31, the polarizer film may be sandwiched by two thin layers, in particular made of thermoplastic material in particular in order to protect the polarizer film. The polarizing assembly 31 may also be formed by a polarizer film alone.

The polarizing assembly 31 is adhesively bonded to the rear face $21_{AR}$ of the interferometric mirror 21 and to the front face $10_{AV}$ of the second external substrate layer 10.

According to one variant (not shown) an adhesion layer, which may be similar in its properties to the first external layer 9, and in particular made of thermoplastic, is placed between the polarizing assembly 31 and the external substrate layer 10. Such an adhesion layer, which is for example fastened in place by adhesive bonding, allows the external substrate layer 10 to be produced by injection molding.

If, in the polarizing assembly 31, the polarizer film is sandwiched by two thin layers, in particular two thin layers made of thermoplastic, the downstream-most layer may also serve as an adhesion layer such as described above.

The interferometric mirror 21 is shown in more detail in FIG. 2. It for example comprises a succession of thin layers M1, M2, M3, M4, M5 and M6. Adjacent thin layers have a refractive index that is different one from the other, but not all the thin layers M1 to M6 have refractive indices that are different from one another.

Of course, the number of thin layers may vary and for example comprise only four or eight layers.

In its structure, the interferometric mirror 21 comprises a first thin layer M1 having a first refractive index $n_1$ and located as close as possible to the rear face $9_{AR}$ of the first external transparent substrate layer 9.

A second thin layer M6 is located as close as possible to the front face $10_{AV}$ of the second external transparent substrate layer 10 possesses second refractive index $n_2$ that is higher than the first refractive index $n_1$.

The first thin layers M1, M3 and M5 are for example made of silica and the second thin layers M2, M4 and M6 are for example made of titanium pentoxide.

Because of the presence of the tie layer 15 on the rear face $9_{AR}$ of the first external layer 9, the first thin layer M1 may adhere and be fastened to the first external layer 9.

Other materials may be chosen, for example so that in the visible domain, the first thin layers M1, M3 and M5 have a first refractive index $n_1$ lower than 1.5, and the second thin layers M2, M4 and M6 have a second refractive index $n_2$ higher than 2 and in particular equal to or higher than 2.3.

Generally, the first thin layers M1, M3 and M5 possess a thickness comprised between 80 μm and 250 μm and in particular 100 μm and 210 μm, and the second thin layers M2, M4 and M6 have a thickness comprised between 15 μm and 50 μm and in particular 20 μm and 40 μm.

According to a very concrete example the interferometric mirror is formed in the following way:

| Thin layer | Material | Thickness |
|---|---|---|
| M1 | $SiO_2$ | 204.70 μm |
| M2 | $Ti_3O_5$ | 35.1 μm |
| M3 | $SiO_2$ | 100.50 μm |
| M4 | $Ti_3O_5$ | 35.20 μm |
| M5 | $SiO_2$ | 100.50 μm |
| M6 | $Ti_3O_5$ | 21.55 μm |

As may be seen in FIG. 2, the first thin layers M1, M3 and M5 and the second thin layers M2, M4 and M6 are therefore arranged in alternation.

As a result a polarizing assembly 31 for example comprising a polarizer film is adhesively bonded to the second thin layer M6 and to the front face $10_{AV}$ of the second external substrate layer 10.

The embodiment of FIG. 3 only differs from that of FIG. 2 in that provision is not made in this embodiment for a polarizer assembly 31. The second external layer 10 is then fastened downstream of the rear face $21_{AR}$ of the interferometric mirror 21.

Provision may be made to fasten the external layer 10 to the rear face $21_{AR}$ of the interferometric mirror 21 with an adhesive 35.

According to one variant (not shown) an adhesion layer, which may be similar in its properties to the first external layer 9, and in particular made of thermoplastic, is placed between the interferometric mirror 21 and the external substrate layer 10. Such an adhesion layer, which is for example fastened by adhesive bonding, allows the external substrate layer 10 to be produced by injection molding.

The embodiment in FIG. 4 differs from that of FIG. 2 in that the polarizing assembly 31 has been replaced by a photochromic layer 41 that is activatable in the UV domain and/or in the visible domain.

This photochromic layer 41 may be a thermoplastic comprising a known photochromic dye. The following families, which are commonly used in ophthalmic lenses, will simply be mentioned by way of example: the spiro-oxazines, the spiro-indoline[2,3']benzoxazines, the chromenes, the homo-aza-adamantane spirooxazines, the spirofluorene-(2H)-benzopyrans, the naphtho[2,1-b]pyrans and the naphtho[1,2-b]pyrans.

It is moreover important for the photochromic layer 41 to be placed downstream of the interferometric mirror 21, because in the contrary case in which the photochromic layer 41 is placed upstream of the interferometric mirror 21, the reflective mirror effect perceived by a third party observer would be lost.

Provision may be made to fasten the external layer 10 to the photochromic layer with an adhesive 35.

According to one variant (not shown) an adhesion layer, which may be similar in its properties to the first external layer 9, and in particular made of thermoplastic, is placed between the photochromic layer 41 and the external substrate layer 10. Such an adhesion layer, which is for example fastened by adhesive bonding, allows the external substrate layer 10 to be produced by injection molding.

The embodiment of FIG. 5 differs from that of FIG. 4 in that a polarizing assembly 31 is placed downstream of the photochromic layer 41. As a result, the polarizing assembly 31 is fastened using a tie layer, for example an adhesive layer 35, to the photochromic layer 41 and adhesively bonded to the front face $10_{AV}$ of the second external substrate layer 10 using an adhesive layer 37.

According to one variant (not shown) an adhesion layer, which may be similar in its properties to the first external layer 9, and in particular made of thermoplastic, is placed between the polarizing assembly 31 and the external substrate layer 10. Such an adhesion layer, which is for example fastened by adhesive bonding, allows the external substrate layer 10 to be produced by injection molding.

If in the polarizing assembly 31, the polarizer film is sandwiched by two thin layers, in particular two thin layers made of thermoplastic, the downstream-most layer may also serve as an adhesion layer such as described above.

It is moreover important for the polarizing assembly 31 to be placed downstream of the photochromic layer 41 because in the contrary case in which the photochromic layer 41 is placed downstream of the polarizing assembly 31, the photochromic effect would lose effectiveness given that the light intensity reaching the photochromic layer 41 would be lower because of the polarizing assembly 31.

It will therefore be understood that the interferometric mirror 21 is better protected against external aggressions, thereby allowing ophthalmic lenses that are more reliable over the long term to be obtained. In addition, it is possible to remove reflections for the eye for the user.

Other variants are possible. Thus, for the embodiments of FIGS. 1A, 1B, 2, 4 and 5, it is possible to replace the interferometric mirror with a semi-reflective metalized layer.

FIGS. 6A-6D schematically show flow charts allowing the various embodiments of the process for manufacturing an ophthalmic lens according to the invention to be illustrated.

Figure 6A:
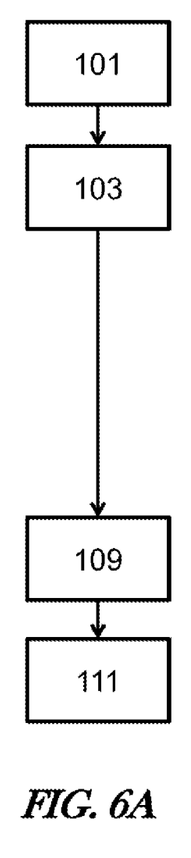

FIG. 6A shows a first embodiment of a manufacturing process for obtaining the ophthalmic lens according to FIG. 3.

This first embodiment of the manufacturing process comprises the following steps:

In a step 101, the tie layer 15 is produced on the rear face $9_{AR}$ of the first external transparent substrate layer 9 by means of the deposition, by spin coating, of a layer of material conventionally used as wear-resistant material (hard coat).

Next, in a step 103, the interferometric mirror 21 is fastened to the rear face $15_{AR}$ of the tie layer 15. This step may be carried out by vacuum deposition of the various thin layers M1 to M6 on the tie layer 15. It will be noted in case of production by vacuum deposition that the deposition order of the layers must then be inverted with respect to the production of an interference mirror with the known manufacturing mode. Specifically, since the layers of this mirror aim to achieve a reflection of light radiation in the downstream direction, they are deposited starting with the upstream layer (here M1) and finishing with the downstream layer (here M6).

In an optional step 109, another adhesion layer, for example one that is similar in its properties to the first external layer 9, is produced downstream of the interferometric mirror 21. This step is necessary if it is desired to produce the second external layer 10 by injection molding. It is not necessary if the second external layer 10 is fastened by adhesive bonding to the interferometric mirror 21.

Next, in a step 111, the second external layer 10 is deposited, in particular by injection molding on the adhesion layer.

Figure 6B:
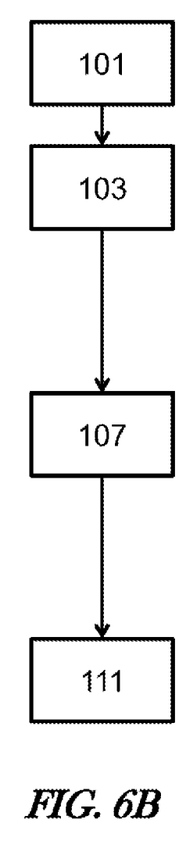

FIG. 6B shows a second embodiment of a manufacturing process for obtaining the ophthalmic lens according to FIGS. 1A, 1B and 2.

This second embodiment of the manufacturing process comprises the following steps:

In a step 101, the tie layer 15 is produced on the rear face $9_{AR}$ of the first external transparent substrate layer 9.

Next, in a step 103, the interferometric mirror 21 is fastened to the rear face $15_{AR}$ of the tie layer 15. This step may be carried out by vacuum deposition of the various thin layers M1 to M6 on the tie layer 15. It will be noted in case of production by vacuum deposition that the deposition order of the layers must then be inverted with respect to the production of an interference mirror with the known manufacturing mode. Specifically, since the layers of this mirror aim to achieve a reflection of light radiation in the downstream direction, they are deposited starting with the upstream layer (here M1) and finishing with the downstream layer (here M6).

In a step 107, a polarizing assembly 31 is fastened to the rear face $21_{AR}$ of the interferometric mirror 21, in particular by adhesive bonding to the interferometric mirror 21; and in a step 111, the second external layer 10 is produced by injection molding, downstream of the polarizing assembly 31, and more particularly by injection molding on the latter and, for example, by fusion of the downstream-most protective layer of the polarizer film 31 with the material of the second external layer 10, which is produced by injection molding. In this example, the polarizer film of the polarizing assembly 31 is sandwiched by two thin layers, which are in particular made of thermoplastic, and the downstream-most layer, which also forms a protective layer, also serves as an adhesion layer such as described above.

Figure 6C:
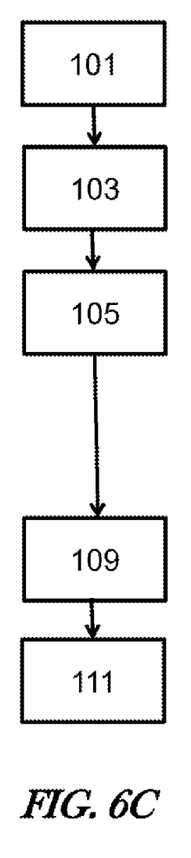

FIG. 6C shows a third embodiment of a manufacturing process for obtaining the ophthalmic lens according to FIG. 4.

This third embodiment of the manufacturing process comprises the following steps:

In a step 101, the tie layer 15 is produced on the rear face $9_{AR}$ of the first external transparent substrate layer 9.

Next, in a step 103, the interferometric mirror 21 is fastened to the rear face $15_{AR}$ of the tie layer 15. This step may be carried out by vacuum deposition of the various thin layers M1 to M6 on the tie layer 15. It will be noted in case of production by vacuum deposition that the deposition order of the layers must then be inverted with respect to the production of an interference mirror with the known manufacturing mode. Specifically, since the layers of this mirror aim to achieve a reflection of light radiation in the downstream direction, they are deposited starting with the upstream layer (here M1) and finishing with the downstream layer (here M6).

In a step 105, a photochromic layer 41 is fastened, for example by adhesive bonding, to the rear face $21_{AR}$ of the interferometric mirror 21.

In an optional step 109, another adhesion layer, for example one that is similar in its properties to the first external layer 9, is produced downstream of the interferometric mirror 21. This step is necessary if it is desired to produce the second external layer 10 by injection molding. It is not necessary if the second external layer 10 is fastened by adhesive bonding to the interferometric mirror 21.

Next, in a step 111, the second external layer 10 is deposited, in particular by injection molding on the adhesion layer.

Figure 6D:
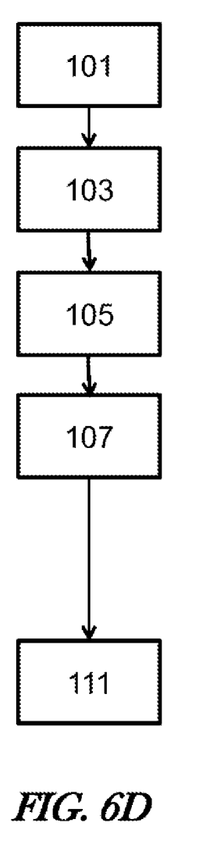

FIG. 6D shows a fourth embodiment of a manufacturing process for obtaining the ophthalmic lens according to FIG. 5.

This fourth embodiment of the manufacturing process comprises the following steps:

In a step 101, the tie layer 15 is produced on the rear face $9_{AR}$ of the first external transparent substrate layer 9.

Next, in a step 103, the interferometric mirror 21 is fastened to the rear face $15_{AR}$ of the tie layer 15. This step may be carried out by vacuum deposition of the various thin layers M1 to M6 on the tie layer 15. It will be noted in case of production by vacuum deposition that the deposition order of the layers must then be inverted with respect to the production of an interference mirror with the known manufacturing mode. Specifically, since the layers of this mirror aim to achieve a reflection of light radiation in the downstream direction, they are deposited starting with the upstream layer (here M1) and finishing with the downstream layer (here M6).

In a step 105, a photochromic layer 41 is fastened, for example by adhesive bonding, to the rear face $21_{AR}$ of the interferometric mirror 21.

In a step 107, a polarizer assembly 31 is fastened, for example by adhesive bonding, to the rear face of the photochromic layer 41.

In a step 111, the second external layer 10 is produced by injection molding, downstream of the polarizer film 31, and more particularly by injection molding on the latter and, for example, by fusion of the downstream-most protective layer of the polarizer film 31 with the material of the second external layer 10, which is produced by injection molding.

In this example, the polarizer film of the polarizing assembly 31 is sandwiched by two thin layers, which are in particular made of thermoplastic, and the downstream-most layer, which also forms a protective layer, also serves as an adhesion layer such as described above.

Preferred embodiments make provision for the interferometric mirror to have a reflectance lower than 80% for all the wavelengths of the visible domain and more particularly for wavelengths comprised between 450 nm and 650 nm inclusive.

Other particular embodiments favor a reflectance lower than 60% in the wavelength range between 450 nm and 600 nm inclusive, or even lower than 40% in this range.

According to these embodiments, the invention therefore allows a mirror effect to be obtained on a lens without however inhibiting or blocking the perception of certain colors.

The invention claimed is:

1. An ophthalmic lens, comprising:
   a first external transparent substrate layer comprising a rear face to be oriented toward an eye of a user of said ophthalmic lens and a front face to be oriented toward a visual field of the user and form a front external surface of the ophthalmic lens; and
   a second external transparent substrate layer comprising a rear face oriented toward the eye of the user and form a concave rear external surface of the ophthalmic lens oriented toward the eye of the user and a front face oriented toward the visual field of the user;
   wherein:
   said lens further comprises an interferometric mirror placed between the first external layer and the second external layer; and
   wherein the interferometric mirror comprises a succession of thin layers (M1, M2, M3, M4, M5, M6) including at least a first thin layer (M1) having a first refractive index ($n_1$) and located as close as possible to the rear face of the first external transparent substrate layer, and a second thin layer (M6) having a second refractive index ($n_2$) higher than the first refractive index ($n_1$) and located as close as possible to the front face of the second external transparent substrate layer.

2. The ophthalmic lens of claim 1, further defined as a sunglass lens.

3. The ophthalmic lens of claim 1, wherein the interferometric mirror comprises at least four thin layers.

4. The ophthalmic lens of claim 1, wherein the one or more first thin layer (M1, M3, M5) is made of silica and the one or more second thin layer (M2, M4, M6) is made of titanium pentoxide, wherein the layers alternate.

5. The ophthalmic lens of claim 1, wherein the one or more first thin layer (M1, M3, M5) has a first refractive index ($n_1$) and a thickness of between 80 μm and 250 μm, and wherein the one or more second thin layer (M2, M4, M6) has a second refractive index ($n_2$) higher than the first refractive index and a thickness of between 15 μm and 50 μm.

6. The ophthalmic lens of claim 1, wherein, in the visible domain, the one or more first thin layer (M1, M3, M5) has a first refractive index lower than 1.5, and wherein the one or more second thin layer (M2, M4, M6) has a second refractive index higher than 2.

7. The ophthalmic lens of claim 1, further comprising a tie layer having a front face against the rear face of the first external layer and a rear face against a front face of the interferometric mirror.

8. The ophthalmic lens of claim 1, further comprising a polarizing assembly between the interferometric mirror and the second external substrate layer.

9. The ophthalmic lens of claim 1, further comprising a photochromic layer that is functional in the UV domain and/or in the visible domain and that is between the interferometric mirror and the second external substrate layer.

10. The ophthalmic lens of claim 9, wherein the photochromic layer is against the interferometric mirror.

11. The ophthalmic lens of claim 9, further comprising a polarizing assembly between the interferometric mirror and the second external substrate layer, wherein the photochromic layer is closer to the interferometric mirror than the polarizing assembly.

12. The ophthalmic lens of claim 1, wherein the first external layer and the second external layer independently comprise at least one of: a mineral or organic glass, a polycarbonate, a polycarbonate/polyester blend, a polyamide, a polyester, a cyclic olefin copolymer, a polyurethane, a polysulfone, a cellulose triacetate (CTA), or cellulose acetate.

13. The ophthalmic lens of claim 9, further comprising a tinted substrate layer comprising a colorant or a pigment, the tinted substrate layer placed downstream of the interferometric mirror and behind the photochromic layer.

14. The ophthalmic lens of claim 13, wherein the second external layer forms the tinted substrate layer.

15. A process for manufacturing an ophthalmic lens of claim 1, comprising:
   producing a tie layer on a rear face of a first external transparent substrate layer;
   fastening an interferometric mirror to the rear face of the tie layer;
   producing a second external layer downstream of the interferometric mirror;
   fastening a photochromic layer to a rear face of the interferometric mirror; and
   fastening a polarizing assembly to a rear face of the photochromic layer;
wherein the second external layer is downstream of the photochromic layer and the polarizing assembly.

16. The manufacturing process of claim 15, wherein the second external layer is produced by injection molding downstream of the rear face of the interferometric mirror.

17. An ophthalmic lens, comprising:
   a first external transparent substrate layer comprising a rear face to be oriented toward an eye of a user of said ophthalmic lens and a front face to be oriented toward a visual field of the user and form a front external surface of the ophthalmic lens;
   a second external transparent substrate layer comprising a rear face oriented toward the eye of the user and form a concave rear external surface of the ophthalmic lens oriented toward the eye of the user and a front face oriented toward the visual field of the user;
   an interferometric mirror placed between the first external layer and the second external layer;
   a photochromic layer that is functional in the UV domain and/or in the visible domain and that is between the interferometric mirror and the second external substrate layer; and
   a polarizing assembly between the interferometric mirror and the second external substrate layer, wherein the photochromic layer is closer to the interferometric mirror than the polarizing assembly.

18. The ophthalmic lens of claim 17, further defined as a sunglass lens.

19. The ophthalmic lens of claim 17, wherein the interferometric mirror comprises a succession of thin layers (M1, M2, M3, M4, M5, M6) including at least a first thin layer (M1) having a first refractive index ($n_1$) and located as close as possible to the rear face of the first external transparent substrate layer, and a second thin layer (M6) having a second refractive index ($n_2$) higher than the first refractive index ($n_1$) and located as close as possible to the front face of the second external transparent substrate layer.

20. The ophthalmic lens of claim 19, wherein the interferometric mirror comprises at least four thin layers.

21. The ophthalmic lens of claim 19, wherein the one or more first thin layer (M1, M3, M5) is made of silica and the one or more second thin layer (M2, M4, M6) is made of titanium pentoxide, wherein the layers alternate.

22. The ophthalmic lens of claim 19, wherein the one or more first thin layer (M1, M3, M5) has a first refractive index (m) and a thickness of between 80 µm and 250 µm, and wherein the one or more second thin layer (M2, M4, M6) has a second refractive index ($n_2$) higher than the first refractive index and a thickness of between 15 µm and 50 µm.

23. The ophthalmic lens of claim 19, wherein, in the visible domain, the one or more first thin layer (M1, M3, M5) has a first refractive index lower than 1.5, and wherein the one or more second thin layer (M2, M4, M6) has a second refractive index higher than 2.

24. The ophthalmic lens of claim 17, wherein the photochromic layer is against the interferometric mirror.

25. The ophthalmic lens of claim 17, further comprising a tie layer having a front face against the rear face of the first external layer and a rear face against a front face of the interferometric mirror.

26. The ophthalmic lens of claim 17, further comprising a polarizing assembly between the interferometric mirror and the second external substrate layer.

27. The ophthalmic lens of claim 17, wherein the first external layer and the second external layer independently comprise at least one of: a mineral or organic glass, a polycarbonate, a polycarbonate/polyester blend, a polyamide, a polyester, a cyclic olefin copolymer, a polyurethane, a polysulfone, a cellulose triacetate (CTA), or cellulose acetate.

28. The ophthalmic lens of claim 17, further comprising a tinted substrate layer comprising a colorant or a pigment, the tinted substrate layer placed downstream of the interferometric mirror and behind the photochromic layer.

29. The ophthalmic lens of claim 28, wherein the second external layer forms the tinted substrate layer.

* * * * *

UNITED STATES PATENT AND TRADEMARK OFFICE
CERTIFICATE OF CORRECTION

PATENT NO. : 10,983,367 B2  
APPLICATION NO. : 16/321395  
DATED : April 20, 2021  
INVENTOR(S) : Didier Clerc and Frank Ledien Page 1 of 1

It is certified that error appears in the above-identified patent and that said Letters Patent is hereby corrected as shown below:

In the Claims

Claim 22, Column 12, Line 20:
Delete "(m)" and replace with -- $(n_1)$ --.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*